(12) United States Patent
Yamashita et al.

(10) Patent No.: US 7,267,211 B2
(45) Date of Patent: Sep. 11, 2007

(54) DAMPER DEVICE AND LOCK-UP CLUTCH DEVICE

(75) Inventors: Toshiya Yamashita, Mishima (JP); Ryuji Ibaraki, Susono (JP); Hiroyuki Shioiri, Susono (JP); Hiroaki Kimura, Susono (JP); Yasunori Nakawaki, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 10/793,279

(22) Filed: Mar. 5, 2004

(65) Prior Publication Data

US 2004/0216979 A1 Nov. 4, 2004

(30) Foreign Application Priority Data

Mar. 7, 2003 (JP) ............................ 2003-061633

(51) Int. Cl.
*F16D 3/14* (2006.01)

(52) U.S. Cl. .............. 192/3.29; 192/70.17; 192/109 R; 192/213.2; 464/67.1; 464/68.1

(58) Field of Classification Search ............... 192/3.29, 192/212, 213, 213.1, 213.2; 464/61.1, 62.1, 464/64.1, 68.1, 68.8, 63.1, 67.1; 267/167
See application file for complete search history.

(56) References Cited

U.S. PATENT DOCUMENTS

| 4,220,233 A | * | 9/1980 | Ban et al. ................. 464/68.41 |
| 4,548,302 A | * | 10/1985 | Lech et al. ................. 192/206 |
| 4,987,980 A | | 1/1991 | Fujimoto |
| 5,407,041 A | | 4/1995 | Fukunaga et al. |
| 6,193,036 B1 | * | 2/2001 | Arhab et al. ............... 192/3.29 |
| 6,273,227 B1 | | 8/2001 | Ohkubo |
| 2004/0216979 A1 | * | 11/2004 | Yamashita et al. .......... 192/212 |

FOREIGN PATENT DOCUMENTS

| DE | 693 14 550 | 3/1998 |
| DE | 199 55 852 | 5/2001 |
| DE | 100 00 899 A1 | 7/2001 |
| JP | 10-47453 | 2/1998 |
| JP | 11-141617 | 5/1999 |
| JP | 2000-266158 A | 9/2000 |
| JP | 2001-295889 A | 10/2001 |

* cited by examiner

*Primary Examiner*—Saul Rodriguez
(74) *Attorney, Agent, or Firm*—Oblon, Spivak, McClelland, Maier & Neustadt, P.C.

(57) ABSTRACT

In a damper device of a lock-up clutch-equipped torque converter which has at least two rotating members that have a common rotation axis and are rotatable relatively to each other via an elastic member, an axial-direction support portion that supports the at least two rotating members in the direction of the rotation axis with respect to each other, and a radial-direction support portion that supports the rotating members in a radial direction with respect to each other are disposed on circumferences that are substantially equidistant from the rotation axis.

28 Claims, 9 Drawing Sheets

DAMPER DEVICE AND LOCK-UP CLUTCH DEVICE

INCORPORATION BY REFERENCE

The disclosure of Japanese Patent Application No. 2003-061633 filed on Mar. 7, 2003 including the specification, drawings and abstract is incorporated herein by reference in its entirety.

BACKGROUND OF THE INVENTION

1. Field of the Invention

The invention relates to a damper device. More particularly, the invention relates to a damper device of a lock-up clutch for use in a torque converter of a motor vehicle or the like, and to a lock-up clutch device that incorporates the damper device.

2. Description of the Related Art

Automatic transmissions are equipped with a torque converter, and are designed so that the rotation of an engine output to the crankshaft is transferred to the input shaft of a speed change device via the torque converter. Generally, the torque converter is made up of a pump impeller, a turbine runner, a stator, etc., and is equipped with a lock-up clutch device and a damper device.

Furthermore, the damper device of the lock-up clutch serves to absorb great impacts caused by sharp changes in torque at the time of lock-up engagement, and also absorbs vibrations caused by fluctuations in the torque of the engine while the vehicle is running during the locked-up clutch state.

For example, Japanese Patent Application Laid-Open Publication No. HEI 11-141617 proposes a damper device which is disposed between a clutch plate for engaging and disengaging a lock-up clutch device and an output member and which includes a spring disposed between a drive plate fixed to the clutch plate and two driven plates fixed to the output member.

Furthermore, Japanese Patent Application Laid-Open Publication No. HEI 10-47453 proposes a damper device in which strength members are reduced in size to reduce weight and reduce the size in the direction of an axis.

In the damper device disclosed in Japanese Patent Application Laid-Open Publication No. HEI 11-141617, the drive plate and the driven plates need to be rotatable relatively to each other. Therefore, it is conceivable that the drive plate and the driven plates rotatable relatively to each other are defined in position in radial directions by utilizing a portion of engagement between a groove formed in an outer peripheral edge of the drive plate and an engaging piece provided at an outer peripheral side of the clutch plate, and that the positioning of the drive plate and the driven plates, rotatable relatively to each other, in the direction of the axis is accomplished by utilizing a portion where the drive plate is sandwiched between the two driven plates via rivets.

In that case, however, the portion for positioning the drive plate and the driven plates in radial directions is located radially outward of the portion for positioning the drive and driven plates in the direction of the axis. Therefore, the damper device tends to have great dimensions in radial directions.

SUMMARY OF THE INVENTION

In view of the aforementioned problems of the conventional art, it is an object of the invention to provide a damper device and a lock-up clutch device that are made smaller in radial directions.

In order to achieve the aforementioned object, a damper device in accordance with a first aspect of the invention has at least two rotating members that have a common rotation axis and are rotatable relatively to each other via an elastic member. In the damper device, an axial-direction support portion that supports the at least two rotating members in the direction of the rotation axis with respect to each other, and a radial-direction support portion that supports the rotating members in a radial direction with respect to each other are disposed on circumferences that are substantially equidistant from the rotation axis.

In this damper device, since the axial-direction support portion that supports the at least two rotating members in the direction of the rotation axis with respect to each other and the radial-direction support portion that supports the rotating members in the radial direction with respect to each other are disposed on circumferences that are substantially equidistant from the rotation axis, a portion for positioning the at least two rotating members relatively to each other in the direction of the axis and a portion for positioning the rotating members relatively to each other in radial directions are positioned on circumferences that are substantially equidistant from the rotation axis. Therefore, it becomes possible to reduce the damper device in size.

In the first aspect of the invention, the axial-direction support portion and the radial-direction support portion may be alternately disposed and may be disposed respectively at substantially equal intervals on the circumference that is located inward of an outermost periphery of the rotating members.

Since the axial-direction support portion and the radial-direction support portion are disposed alternately and respectively at substantially equal intervals at a radially inward side, the size of the damper device can be further reduced in radial directions.

A damper device in accordance with a second aspect of the invention has at least two rotating members that have a common rotation axis and are rotatable relatively to each other via an elastic member. In the damper device, an axial-direction support portion that supports the at least two rotating members in the direction of the rotation axis with respect to each other, and a radial-direction support portion that supports the rotating members in a radial direction with respect to each other are deviated in position from each other in the direction of rotation about the rotation axis.

According to the second aspect of the invention, since the axial-direction support portion that supports the at least two rotating members in the direction of the rotation axis with respect to each other and the radial-direction support portion that supports the rotating members in a radial direction with respect to each other are deviated in position from each other in the direction of rotation about the rotation axis, the axial-direction support portion and the radial-direction support portion are not aligned in radial directions with respect to the rotation axis. That is, a portion for positioning the two rotating members relatively to each other in the direction of the axis and a portion for positioning the rotating members relatively to each other in a radial direction are not aligned in radial directions with respect to the rotation axis. Therefore, the size of the damper device can be reduced in radial directions.

In the first and second aspects of the invention, the at least two rotating members may respectively have stopper portions that contact each other at a predetermined relative angle, and the stoppers may be disposed on a circumference whose distance from the rotation axis is substantially equal to the distances of the axial-direction support portion and the radial-direction support portion from the rotation axis.

The stopper portions limit the deformation of the elastic member caused by turn or twist torque to a certain amount even if the turn or twist torque becomes excessively great. If the stopper function portion needed for protection of the elastic member is disposed on the aforementioned circumference, it becomes possible to further reduce the size of the damper device in radial directions.

Furthermore, the at least two rotating members may include a driving-side rotating member and a driven-side rotating member, and the driven-side rotating member may be formed by a plurality of members that guide the elastic member and sandwich the driving-side rotating member, and a fixation portion that fixes the plurality of members to one another may be disposed on a circumference whose distance from the rotation axis is substantially equal to the distances of the axial-direction support portion and the radial-direction support portion from the rotation axis.

If at least one of the rotating members is formed by a plurality of component members, it becomes necessary to provide a function of fixing the component members to one another. Portions for fixing the component members may also be disposed on the aforementioned circumference, so that the four positioning function portions required of the damper device will be disposed on circumferences that are substantially equidistant from the common rotation axis. Therefore, accomplishment of a size reduction in radial directions is further facilitated.

In this construction, each one of the plurality of members of the driven-side rotating member may have a first tab and a second tab that is provided inwardly of an outermost periphery of the first tab, and a portion where the first tab sandwichs the driving-side rotating member may include the axial-direction support portion, and the second tab may include the radial-direction support portion, the stopper portion and the fixation portion.

In the damper device in which the second tab is provided as a positioning member inwardly of the radially outermost portion of the rotating members, it becomes possible to realize the radial supporting function, the stopper function and the function of fixing a plurality of members to one another in an integrated and consolidated fashion via the second tab member. Therefore, the circumferential arrangement of the four functions needed for the positioning is further facilitated, and further effective utilization of space becomes possible.

In the above-described constructions, the axial-direction support portion and the radial-direction support portion may be deviated in position from each other in the direction of the rotation axis.

Since the axial-direction support portion and the radial-direction support portion are disposed with a positional deviation from each other in the direction of the rotation axis, portions that allow positioning functions can be subjected to a cutting process using a lathe, so that workability will improve and dimensional accuracy can be enhanced. Hence, the positioning accuracy can be further improved.

Furthermore, the elastic member may include a first spring, and a second spring that is disposed within the first spring and that has a shorter length and a smaller diameter than the first spring, and the first spring may have a first contact surface that contacts one of the two rotating members, and the second spring may have a second contact surface that contacts one of the two rotating members, and an angle formed by the first contact surface and the second contact surface on a plane that is perpendicular to the rotation axis may be greater than a predetermined angle.

In this damper device, the springs are uniformly compressed by the contact surfaces that have appropriate angles. Therefore, it becomes possible to achieve reduced hysteresis, increased durability and stable operation of the springs.

A lock-up clutch device in accordance with a third aspect of the invention includes the damper device of the first or second aspect. According to the third aspect, it is possible to provide a lock-up clutch device that is reduced in size in radial directions.

In the third aspect, the lock-up clutch device may further include a piston that is disposed concentrically with the damper device and is movable in the direction of the rotation axis, and the driving-side rotating member of the damper device may be provided with a support portion that has, on two surfaces thereof, friction members, and the friction members may be disposed between the piston and a housing of the torque converter.

According to the third aspect, the attachment of the friction plates to the driving-side rotating member of the damper device via a support member facilitates accomplishment of the positioning of the friction plates in radial directions, so that the transferred torque can be stabilized. At least a friction surface of the friction members may be formed so as to undulate in a circumferential direction.

Generally in lock-up clutches wherein the friction surface of a disc performs the function of sealing so as to maintain the differential pressure across the piston during the lockup, such a friction surface of the disc becomes a factor that causes great dragging torque when the disc is pressed against the piston side or the housing member side due to the flow of hydraulic oil passing during release of the lockup. However, the provision of circumferentially extending undulations of the friction surfaces achieves uniform flows of hydraulic oil on both sides of the disc, and therefore curbs the occurrence of dragging torque.

BRIEF DESCRIPTION OF THE DRAWINGS

FIG. 5A illustrates a state where the intermediate plate and the drive plate contact the first the spring. FIG. 5B illustrates a state where the drive plate has turned in a direction indicated by an arrow 60, and the intermediate plate and the drive plate contacts a second the spring.

DETAILED DESCRIPTION OF THE PREFERRED EMBODIMENTS

Preferred embodiments of the invention will be described hereinafter with reference to the accompanying drawings.

FIGS. 1A, 1B, 2, 3A, 3B, 4, 5A, 5B and 6 illustrate embodiments of the damper device of a lock-up clutch of the invention.

Figure 1A:
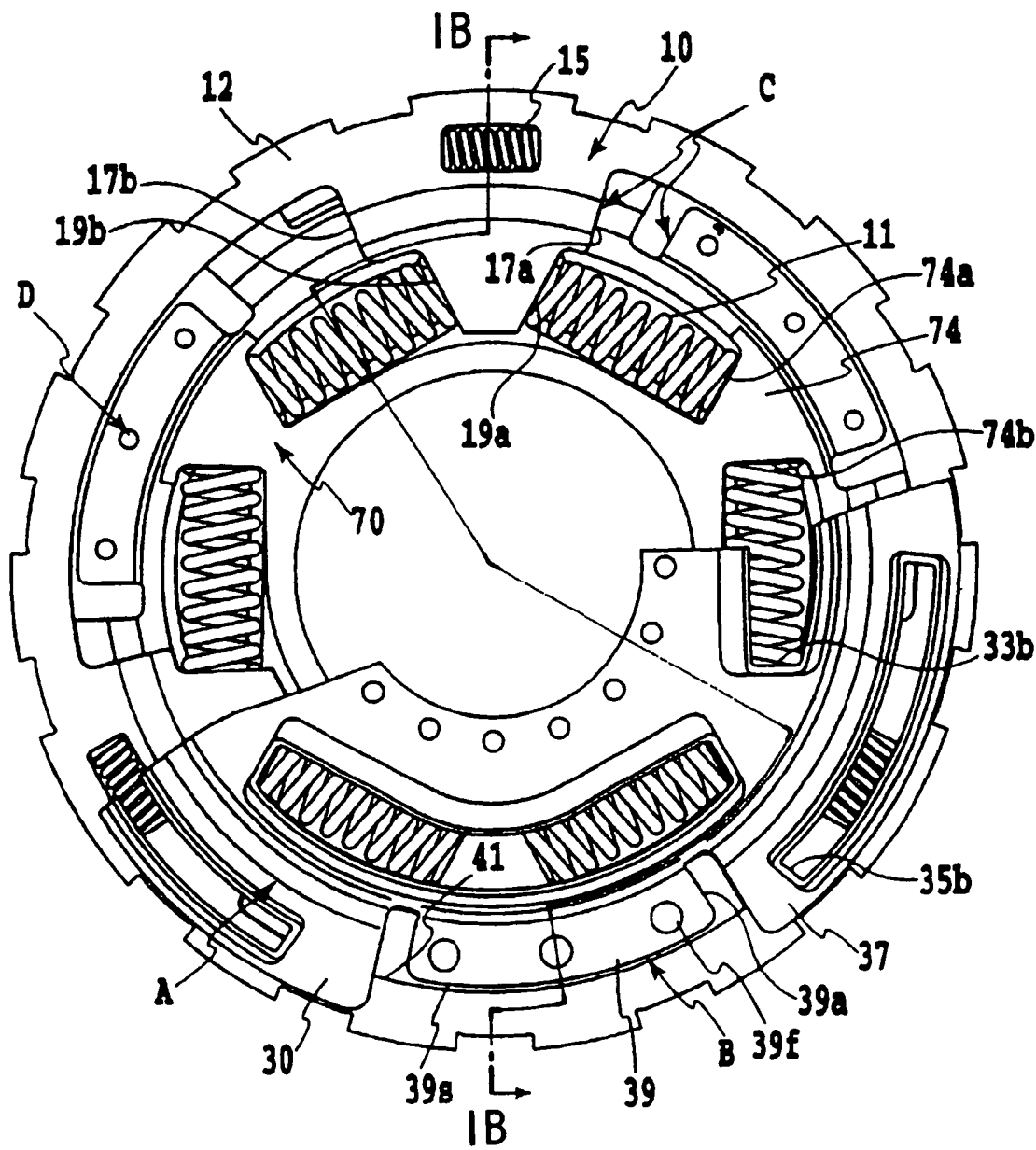
FIG. 1A is a partially cut-away plan view of a damper device of a lock-up clutch of a torque converter.
Figure 1B:
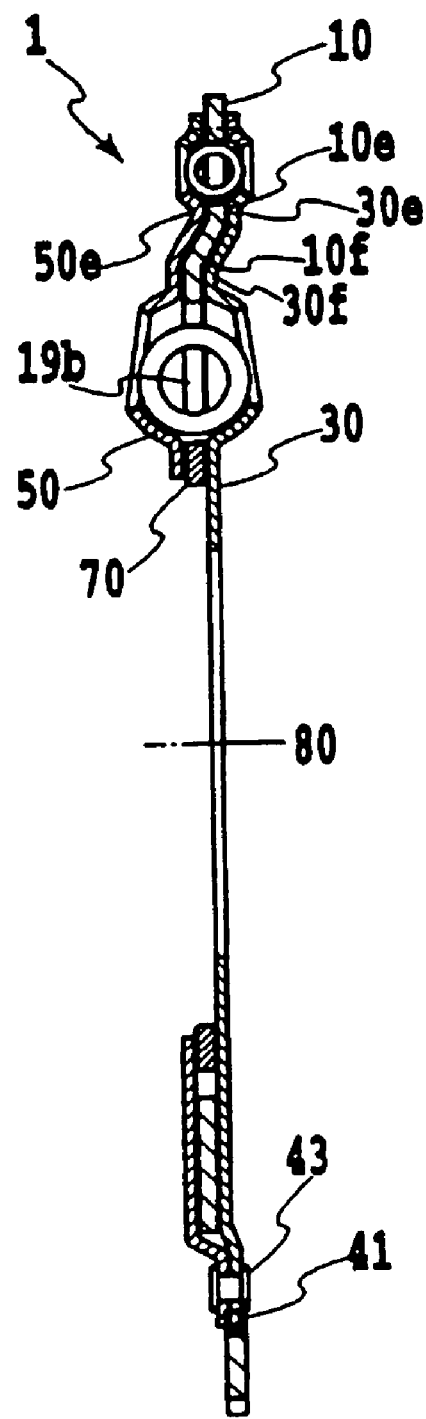
FIG. 1B is a sectional view taken along line IB—IB in FIG. 1A.

FIG. 1A is a partially cut-away plan view of a damper device of a lock-up clutch of a torque converter in accordance with the invention, and FIG. 1B is a sectional view taken along line IB—IB in FIG. 1A.

Figure 2:
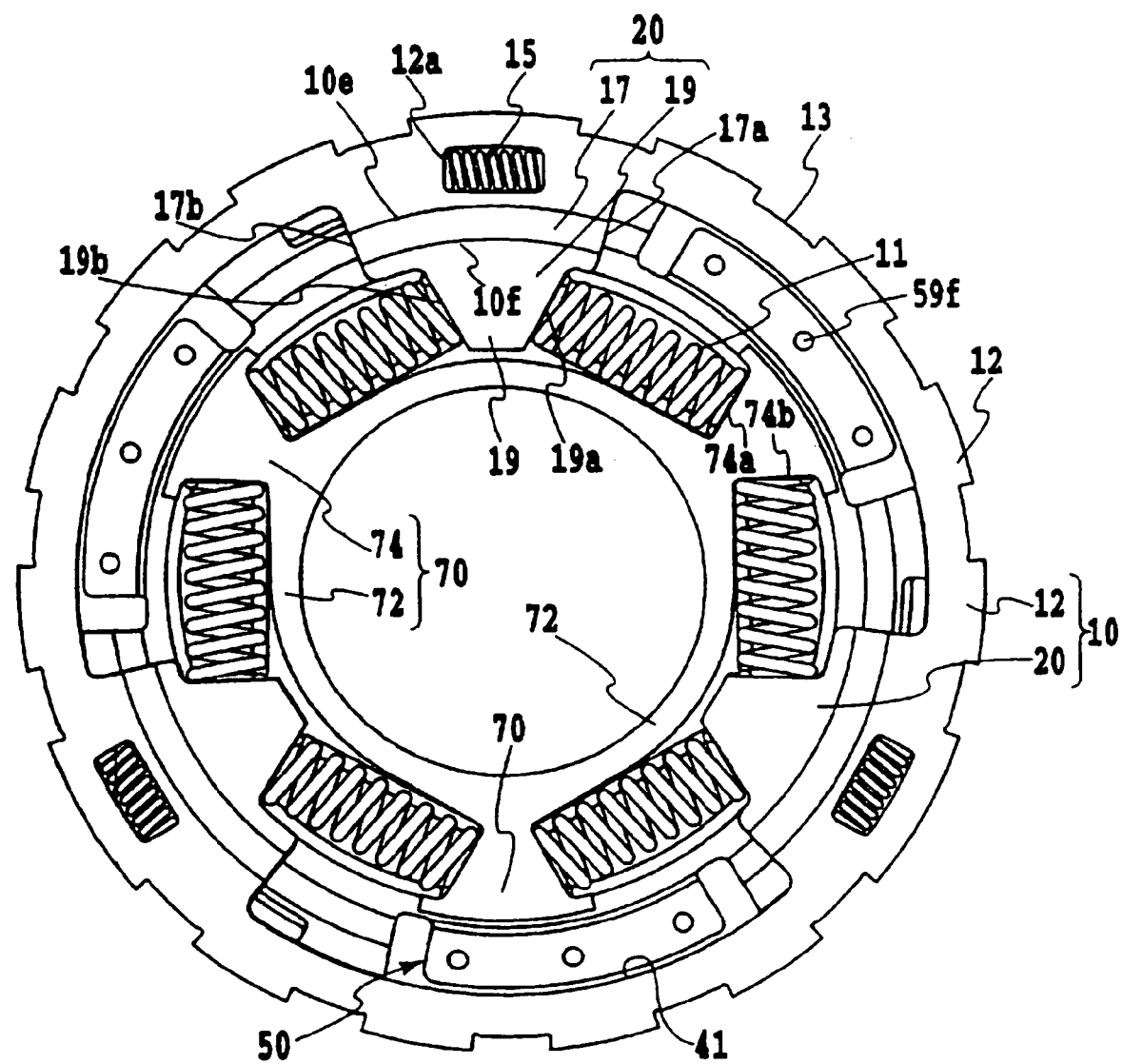
FIG. 2 is a plan view illustrating the arrangement of a drive plate, and intermediate plate and an elastic member of the damper device.

FIG. 2 is a plan view illustrating the arrangement of a drive plate 10, and an intermediate plate 70 and an elastic member of the damper device in accordance with the invention, from which a first guide plate 30 has been removed.

Figure 3A:
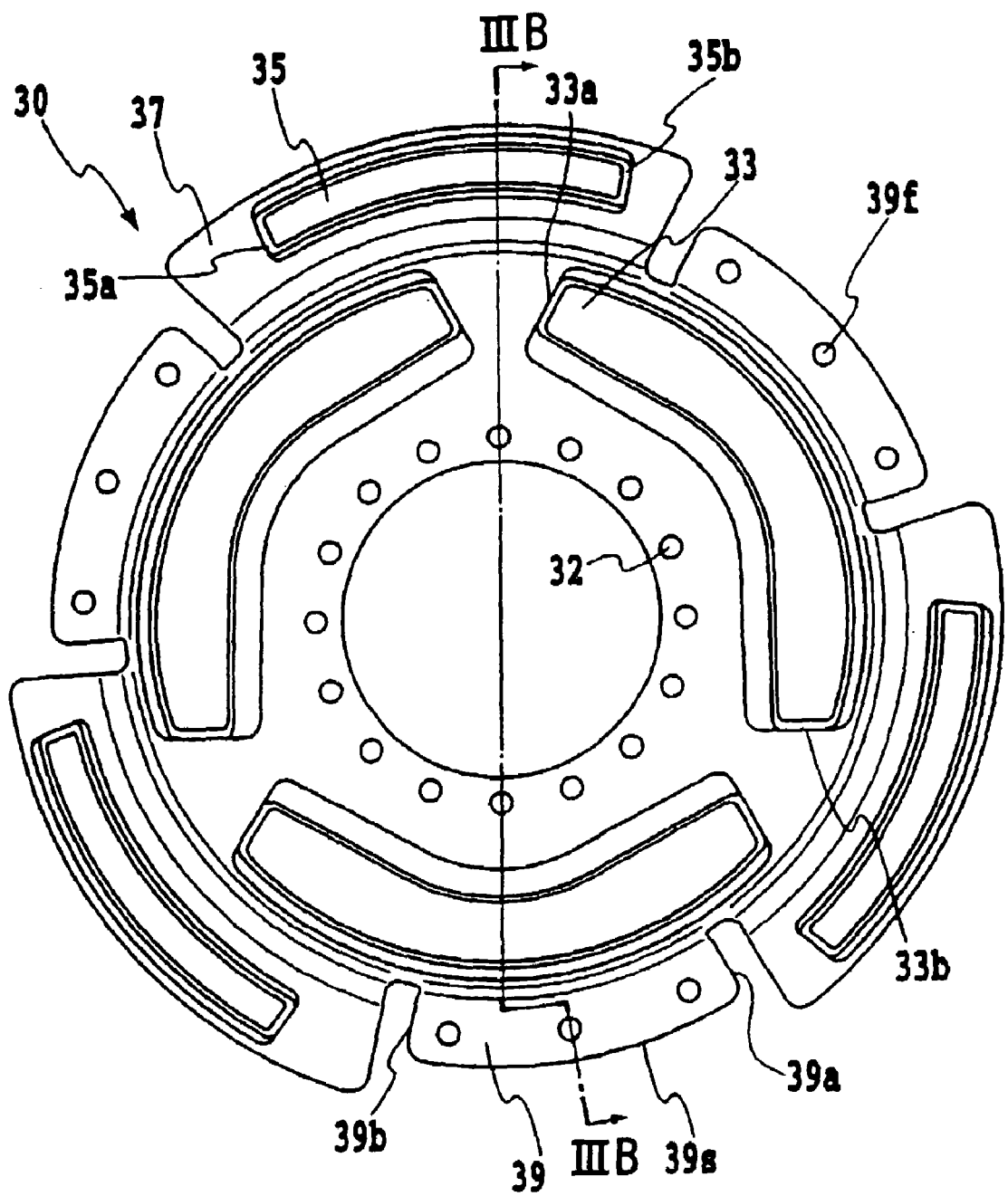
FIG. 3A is a plan view of a guide plate of the damper device.
Figure 3B:
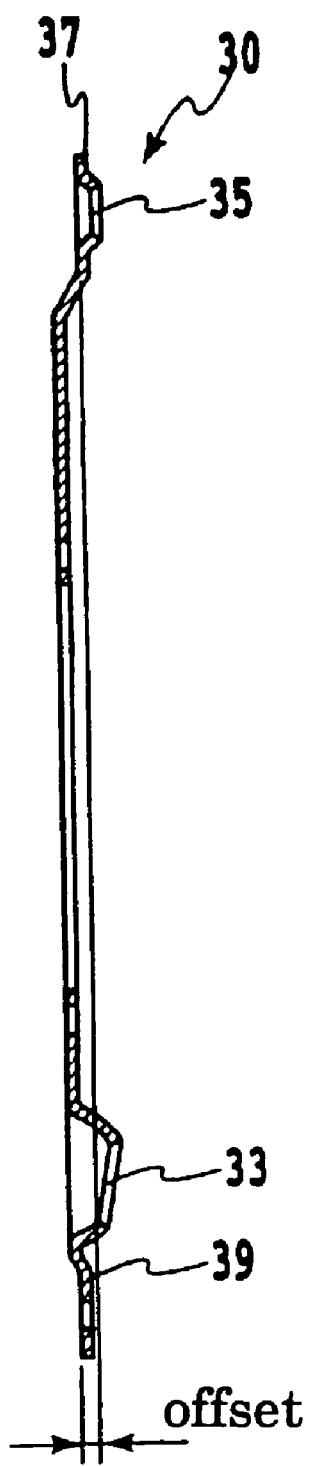
FIG. 3B is a sectional view taken along line IIIB—IIIB in FIG. 3B.

FIG. 3A is a plan view of the first guide plate 30 of the damper device in accordance with the invention, and FIG. 3B is a sectional view taken along line IIIB—IIIB in FIG. 3B.

Figure 4:
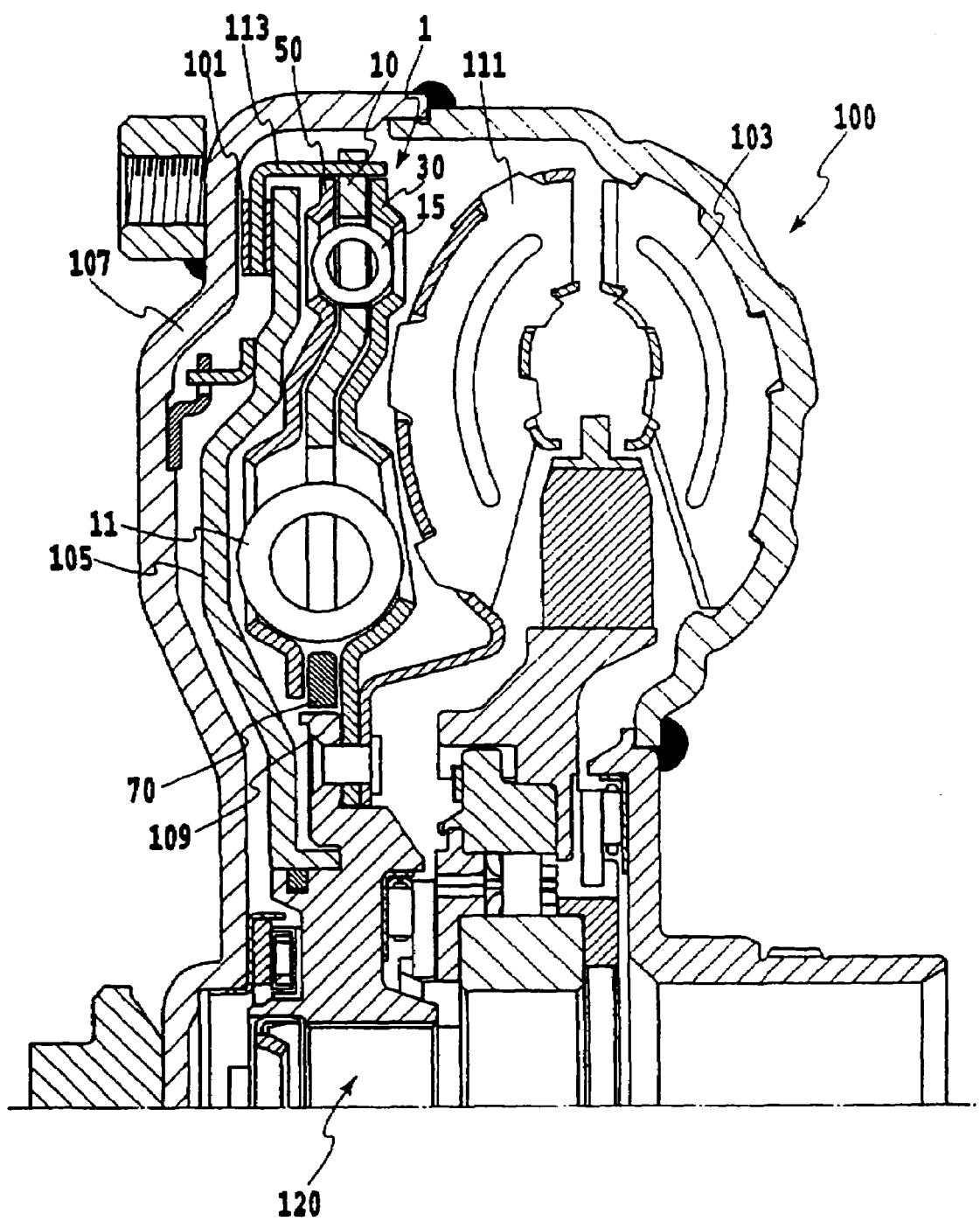
FIG. 4 is a sectional view of an upper half of the torque converter.

FIG. 4 is a sectional view of an upper half of a torque converter 100 equipped with a lock-up clutch in accordance with the invention.

First, the torque converter to which the damper device of the lock-up clutch in accordance with an embodiment of the invention is applied will be described with reference to FIG. 4.

In the torque converter 100, rotation from the engine is transferred to a pump impeller 103 via a converter cover 107, and the flow of hydraulic oil caused by rotation of the pump impeller 103 rotates a turbine runner 111, and rotation of the turbine runner 111 is transferred to an input shaft 120 of a speed change device.

The lock-up clutch device has a piston 105 that can be moved in the directions of an axis and that can be engaged with and disengaged from the converter cover 107 via a friction plate 101. The piston 105 is moved in the direction of the axis via a controlled oil pressure so as to engage with or disengage from the converter cover 107, so that a predetermined state of connection between the pump impeller 103 (integrally connected to the converter cover 107) and a turbine runner 111 is achieved. That is, during a state where the piston 105 is disengaged from the converter cover 107, the power input to the pump impeller 103 from the converter cover 107 is transferred to the turbine runner 111 via hydraulic oil present in the torque converter 100. Conversely, when the piston 105 engages with the converter cover 107 via the friction plate 101, the converter cover 107 (the pump impeller 103) and the turbine runner 111 are connected via the lock-up clutch, so that rotation of the engine is directly transferred to the input shaft 120, without involvement of hydraulic oil (the lock-up clutch is engaged to establish a locked-up state (lockup)).

As mentioned above, the damper device 1 of the lock-up clutch device absorbs great impacts caused by sharp changes in torque at the time of lockup engagement, and also absorbs vibrations associated with fluctuations in the torque of the engine while the vehicle is running during the locked-up state.

The damper device 1 of the lock-up clutch of this embodiment is disposed in the torque converter 100, and is designed so that a drive plate 10, that is, an annular driving-side rotating member to which a drum member 113 provided with the friction plate 101 is connected, rotates together with the pump impeller 103 during the lockup. Furthermore, the drive plate 10, the elastic member 11 and the intermediate plate 70 are integrally sandwiched by first and second guide plates 30, 50, that is, a plurality of members of the annular driven-side rotating member. A radially innermost portion of the first guide plate 30 is fixed to a turbine hub 109, that is, an output member, via rivets or the like, and is directly coupled to the input shaft 120 of the speed change device.

Next, embodiments of major members of the damper device of the invention will be described in detail.

As shown in FIG. 2, the drive plate 10, that is, a driving member, is an annular member in which an outer peripheral portion 12, that is, a radially outermost portion-adjacent region, is flat, and the outer peripheral edge has a plurality of recesses 13 with which dogs of the drum member 113 are engaged. The outer peripheral portion 12 further has opening portions 12a that are provided substantially equidistantly (at approximately equal intervals) in the circumferential direction. The number of the opening portions 12a is, for example, three. Each one of the opening portions 12a houses an outer spring 15 that is a coil spring. The drive plate 10 further has protruded portions 20 at sites that are radially inward of the outer peripheral portion 12 and that correspond to the opening portions 12a. The protruded portions 20 are protruded toward the center of rotation, and are rotationally symmetric. Each protruded portion 20 is formed by a base portion 17 and a trapezoidal engagement lug 19. Between the base portions 17 of the protruded portions 20, inner peripheral surfaces 41 are formed which have such a diameter as to outwardly contact or circumscribe the outer edges of inner tabs (described below) of the first guide plate 30. Two opposite side edges of the base portion 17 of each protruded portion 20 respectively form a stopper portion 17a that contacts a corresponding one of stopper portions (described below) of the first guide plate 30 at a predetermined clockwise twist angle, and a stopper portion 17b that contacts a corresponding one of the stopper portions (described below) of the first guide plate 30 at a predetermined counterclockwise twist angle. Two opposite side edges of each trapezoidal engagement lug 19 respectively form a contact surface 19a that presses a corresponding one of inner springs 11 that are coil springs when the drive plate 10 is turned clockwise, and a contact surface 19a that presses a corresponding one of the inner springs 11 when the drive plate 10 is turned counterclockwise. Furthermore, as indicated in FIG. 1B, in each protruded portion 20, the base portion 1 has a first bent portion 10e and a second bent portion 10f that is located radially inward of the first bent portion 10e, and the trapezoidal engagement lug 19 extends radially inward from the second bent portion 10f. Each trapezoidal engagement lug 19 is parallel to the outer peripheral portion 12 with respect to the directions of the axis.

Referring back to FIG. 2, the intermediate plate 70 is a member whose inner peripheral portion 72 is flat and annular, and a fan-shaped engagement lug 74 extends radially outward from the inner peripheral portion 72 at each of a plurality of sites, for example, three sites, located in the circumferential direction. Two opposite side edges of each engagement lug 74 respectively form contact surfaces 74a, 74b that face corresponding contact surfaces 19a, 19b of the adjacent trapezoidal engagement lugs 19 of the drive plate 10 via the inner springs 11.

In this embodiment, power is transferred from the drive plate 10 to the first guide plate 30 via the intermediate plate 70. However, in another possible construction, the intermediate plate 70 is omitted, and power is transferred from the drive plate 10 to the first guide plate 30 directly via springs.

As indicated in FIGS. 1A and 1B, the first guide plate 30 serves together with the second guide plate 50 to sandwich the drive plate 10 in which the outer springs 15 are disposed within the opening portion 12a, as well as the intermediate plate 70 and the inner springs 11. Furthermore, as best illustrated in FIGS. 3A and 3B, the first guide plate 30 is an annular output member having, near an inner peripheral portion thereof, a direct coupling portion 32 that is directly coupled to the input shaft 120 of the speed change device. Formed near the direct coupling portion 32 are raised inner guide portions 33 each of which has an arc-shaped elongated hole in a top portion thereof so as to guide the inner springs 11 by operating integrally with the second guide plate 50. Furthermore, near the outer peripheral portion of the first guide plate 30, outer tabs 37, that is, first tabs, are provided each of which includes a raised outer guide portion 35 that has an arc-shaped elongated hole in a top portion thereof so as to guide the outer springs 15 by operating integrally with the second guide plate 50, and inner tabs 39, that is, second tabs, are provided radially inward of the outer tabs 37. The inner tabs 39 serve as portions for fixation or firm connection to the second guide plate 50. An outer edge 39s of each inner tab 39 allows the positioning in radial directions. Furthermore, two opposite side edges of each inner tab 39 respectively form stopper portions 39a, 39b that contact corresponding stopper portions 17a, 17b of the drive plate 10. Two opposite end portions 33a, 33b of each inner guide portion 33 respectively form contact surfaces that contact corresponding inner springs 11. Two opposite end portions 35a, 35b of each outer guide portion 35 respectively form contact surfaces that contact corresponding outer springs 15 at a predetermined twist angle. Still further, as shown in FIG. 1B, the first guide plate 30 has bent portions 30e, 30f at substantially the same positions as the bent portions 10e, 10f of the drive plate 10 in a view in the direction of the axis. The first guide plate 30 operate together with the second guide plate 50 to sandwich the drive plate 10 and the intermediate plate 70, and is shaped so as to extend following the surfaces of the drive plate 10 and the intermediate plate 70.

As for the inner guide portions 33, the outer guide portions 35, the inner tabs 39, the outer tabs 37, etc., the portions of each kind may be arranged in the circumferential direction in a substantially rotational symmetric fashion as indicated in FIG. 2, and the number of portions of each kind may be, for example, three.

The second guide plate 50, being integral with the first guide plate 30, functions as a driven member together. The second guide plate 50 performs substantially the same functions as the first guide plate 30, and has substantially the same construction as the first guide plate 30, except for the direct coupling portion 32. Portions of the second guide plate 50 corresponding to the stopper portions 39a, 39b and the outer edges 39s of the first guide plate 30 are slightly smaller than those of the first guide plate 30. A radial-direction positioning function portion B and a stopper function portion C (described below) are concentratedly provided only in the first guide plate 30.

Although in this embodiment, the radial-direction positioning function portion B and the stopper function portion C are concentratedly provided in the first guide plate 30, one or both of the radial-direction positioning function portion B and the stopper portion C may be provided in the second guide plate 50.

Furthermore in the embodiment, the first and second guide plates 30, 50 for guiding the springs are provided as driven-side rotating members. However, these plates may be provided as driving-side rotating members and the drive plate 1 may be provided as a driven-side rotating member, so that the driven-side rotating member is sandwiched between the driving-side rotating members.

Operation of an embodiment of the damper device of the lock-up clutch of the invention constructed as described above will be described.

In the damper device of the invention, the drive plate 10 is associated with the first and second guide plates (output members) 30, 50 elastically in the rotational directions via the protruded portions 20 of the drive plate 10, the inner springs 11, and the fan-shaped engagement lugs 74 of the intermediate plate 70 provided between the inner springs 11. Therefore, the drive plate 10 is turned together with the housing member 107 during the locked-up state. The first and second guide plates 30, 50 are integrally fixed via fixation portions, and sandwich therebetween the drive plate 10 and the intermediate plate 70. At the inner guide portions 33, the first and second guide plates 30, 50 hold the inner springs 11 forming elastic members, via the intermediate plate 70, and guide the course of expansion and contraction of the springs 11. Similarly, at the outer guide portions 35, the first and second guide plates 30, 50 guide the course of expansion and contraction of the outer springs 15, that is, elastic members embedded in the drive plate 10. A radially inward portion of the first guide plate 30 is fixed to the turbine hub 109, that is, an output member, and rotates together with the input shaft 120 of the speed change device. In the damper device of the lock-up clutch, as the lock-up piston 105 is moved leftward in FIG. 4 in the direction of the axis so that the friction plate 101 contacts the inner surface of the housing member 107 of the torque converter 100, a directly-coupled state is established in which rotation of the engine (not shown) is directly transferred via the lock-up clutch. At this moment, impact-causing torque fluctuations are transferred from the lock-up piston 105 to the turbine hub 109. However, the damper device 1 of the invention absorbs the torque fluctuations as described below.

With reference to FIGS. 1A, 1B and 4, the torque transferred by the lock-up piston 105 is transferred, via the friction plate 101, to the drive plate 10 that is integrated with the friction plate 101 in the rotating direction, and is transferred from the drive plate 10 to the intermediate plate 70 via the inner springs 11. The rotation is further transferred to the guide plates 30, 50 that are integral via adjacent inner springs 11. If a greater torsional torque occurs, the outer springs 15 operate as well, and cooperate together with the inner springs 11 so as to absorb torque fluctuations.

With reference to FIGS. 1A and 1B, for example, if the drive plate 10 is turned clockwise, each inner spring-contact surface 19a of the drive plate 10 pushes an end of the adjacent one of inner springs 11, and the opposite end thereof pushes the contact surface 74b of the adjacent one of the engagement lugs 74 of the intermediate plate 70. The contact surface 74b of each engagement lug 74 of the intermediate plate 70 pushes an end of the adjacent inner spring 11, and the opposite end thereof pushes the ends 33b of the adjacent guide portions 33 of the guide plates 30, 50. In this manner, torque is transferred from the drive plate 10 to the first and second guide plates 30, 50 via the inner springs 11. If the drive plate 10 is further turned clockwise, each outer spring 15 embedded in the drive plate 10 contacts the end 35b of the adjacent one of the outer guide portions 35. Therefore, torque is transferred via the inner springs 11 and the outer springs 15. If the drive plate 10 is still further, turned clockwise, the stoppers 17a of the drive plate 10 contact the stoppers 39a of the first guide plate 30. Thus, deformation of the springs exceeding a predetermined amount is restricted to protect the springs.

According to the damper device 1, torque is transferred via the damper springs as described above. Therefore, fluctuations in torque input to the driving-side rotating member are not directly transferred to the input shaft of the speed change device, so that occurrence of vibrations, noises, etc., will be substantially prevented.

It is to be noted herein that in the damper device of the lock-up clutch, the driving-side members and the driven-side members are elastically associated via elastic members so that the members cooperate to absorb torque fluctuations occurring on the driving side. Therefore, the positioning of the component members and the shafts is important.

Therefore, examples of the structural functions required of the damper device include main functions for realizing predetermined torsional characteristics, and further include:

(1) a function of positioning a driving-side member and a driven-side member rotatable relatively to each other in terms of the position in the direction of the axis
(2) a function of positioning a driving-side member and a driven-side member rotatable relatively to each other in terms of the position in radial directions
(3) a stopper function of limiting the amount of compression of each damper spring to a predetermined amount and therefore protecting the springs
(4) a function of fixing members that guide the damper springs Next described will be realization of the foregoing structural functions in the damper device of the invention constructed as described above.

The function of positioning in the direction of the axis is realized by an axial positioning function portion A (see FIG. 1A) that prevents (restricts) displacement between the drive plate 10 and the first and second guide plates 30, 50 in the direction of the axis due to an arrangement as shown in FIG. 1B in which the bent portion 10e and its adjacent portion of the drive plate 10 are sandwiched by the bent portions 30e, 50e of the first and second guide plates 30, 50, which follow the shape of the bent portion 10e.

The function of positioning in radial directions is realized by a radial positioning function portion B that prevents (restricts) displacement between the drive plate 10 and the first and second guide plates 30, 50 in radial directions due to an arrangement as shown in FIGS. 1A and 1B in which the inner peripheral surfaces 41 of the drive plate 10 positioned by the axial positioning function portion A is accompanied by the outer edge portions 39s of the inner tabs 39 of the first guide plate 30 whose diameter is substantially equal to the diameter of the inner peripheral surfaces 41.

The first guide plate 30, which includes the inner tabs 39 forming the radial positioning function portion B, can be shaped by a stamping press process, whereby dimensional accuracy will be improved in comparison with a conventional bending process.

Furthermore, of the first and second guide plates 30, 50, the first guide plate 30 connected to the input shaft 120 of the speed change device is solely assigned with the radial positioning function as indicated in FIG. 1B, so as to reduce the burden imposed on the fixation portions 39f, 59f of the two guide plates. Furthermore, this will also curb the reduction in positioning accuracy caused by dimensional deviation of the first and second guide plates 30, 50.

The axial positioning function portion A and the radial positioning function portion B are located at substantially equal distances (approximately equal distances) from a common rotation axis 80, and are deviated in position from each other in the direction of rotation about the rotation axis.

Furthermore, the axial positioning function portion A and the radial positioning function portion B are disposed substantially equidistantly (at approximately equal intervals) along a circumference that is inward of the outermost circumference, and are alternately arranged in a rotationally symmetric fashion.

In the damper device constructed as described above, the radial-direction support portions and the axial-direction support portions are arranged along circumferences that are substantially equidistant from the rotation axis, that is, are deviated in position from each other in the rotating direction of the rotation axis and are not aligned in radial directions. This construction allows a further size reduction of the damper device in radial directions than the conventional construction. Therefore, in view of ease of installation in vehicles, a damper device that is compact in radial directions and is suitable for devices, for example, a belt-type CVT, whose size reductions particularly in radial directions are demanded can be provided.

Furthermore, since the radial-direction support portions and the axial-direction support portions are spaced substantially uniformly and are alternately arranged on a radially inward side, the individual member portions contribute to the realization of the positioning function in a good balance, and a further size reduction in radial directions can be achieved.

The stopper function is realized by the drive plate 10 and the first guide plate 30 having the stopper portions 17a, 17b, 39a, 39b that form a stopper function portion C that contacts the first guide plate 30 to prevent compressions of the springs greater than a predetermined amount of compression when the drive plate 10 is turned clockwise or counterclockwise by a predetermined twist angle.

In reality, during a driving state where power from the engine is transferred so as to drive wheels of the vehicle, the drive plate 10 is turned counterclockwise, so that the stopper portions 17b and the stopper portions 39b contact each other to function as the stopper function portion C. Conversely, during a driven state (normally, during deceleration of the vehicle) where the engine is driven by the wheels, the first and second guide plates 30, 50 are turned counterclockwise, so that the stopper portions 17a and the stopper portions 39a contact each other to function as the stopper function portion C.

In FIG. 1A, the stopper function portion C is shown in a partially cut-away plan view. Although this cut-away view does not provide a thorough illustration, the stopper function portion C is formed by the contact surfaces 39a of the first guide plate 30 and the contact surfaces 17b of the drive plate 10 and by the contact surfaces 39b of the first guide plate 30 and the contact surfaces 17a of the drive plate 10.

Of the first and second guide plates 30, 50, only the first guide plate 30 connected to the input shaft 120 of the speed change device may be assigned with the stopper function, as in the case of the radial direction positioning function, so that the burden imposed on the fixation portions 39f, 59f can be reduced.

If one of the rotating members is formed by a plurality of members as in the foregoing embodiment, functions for fixation between members are needed. That is, a fixation function portion D for the first and second guide plates 30, 50 for guiding the springs 11, 15 is realized by the fixation portions 39f, 59f through the use of the inner tabs 39 and the rivets 43.

In the damper device of the invention constructed as described above, all the function portions required of the damper device can be disposed along circumferences that are located at substantially equal distances (approximately equal distances) from the common rotation axis 80 as indicated in FIG. 1A. Furthermore, due to the formation of the radial support function portion by the outer edges 39s of the inner tabs 39 and the formation of the stopper function portion by the side edges 39a, 39b of the inner tabs 39 as well as the formation of the fixation function portion for the first and second guide plates 30, 50 through the use of the rivet fastening via the inner tabs 39, the aforementioned circumferential arrangement for size reductions in radial directions can easily be realized.

Therefore, it becomes possible to realize a compact damper device that allows further size reductions in radial directions. Therefore, the size of a lock-up clutch device and the size of a torque converter incorporating the lock-up clutch device can also be reduced in radial directions.

Furthermore, as shown in FIG. 3B, since an offset in the direction of the axis is provided between a bottom surface of the outer tabs 37 that include the outer guide portions 35 provided for guiding the outer springs and a bottom surface of the inner tabs 39 that perform the radial positioning function, a portion that allows the function of positioning the radial-direction support portions in radial directions can be subjected to a cutting process using a lathe. That is, the outer peripheries 39s of the inner tabs 39 can be cut via a lathe, so that the dimensional accuracy will further improve and therefore the positioning accuracy will improve.

Next described will be another embodiment of the damper device of the invention.

Figure 5A:
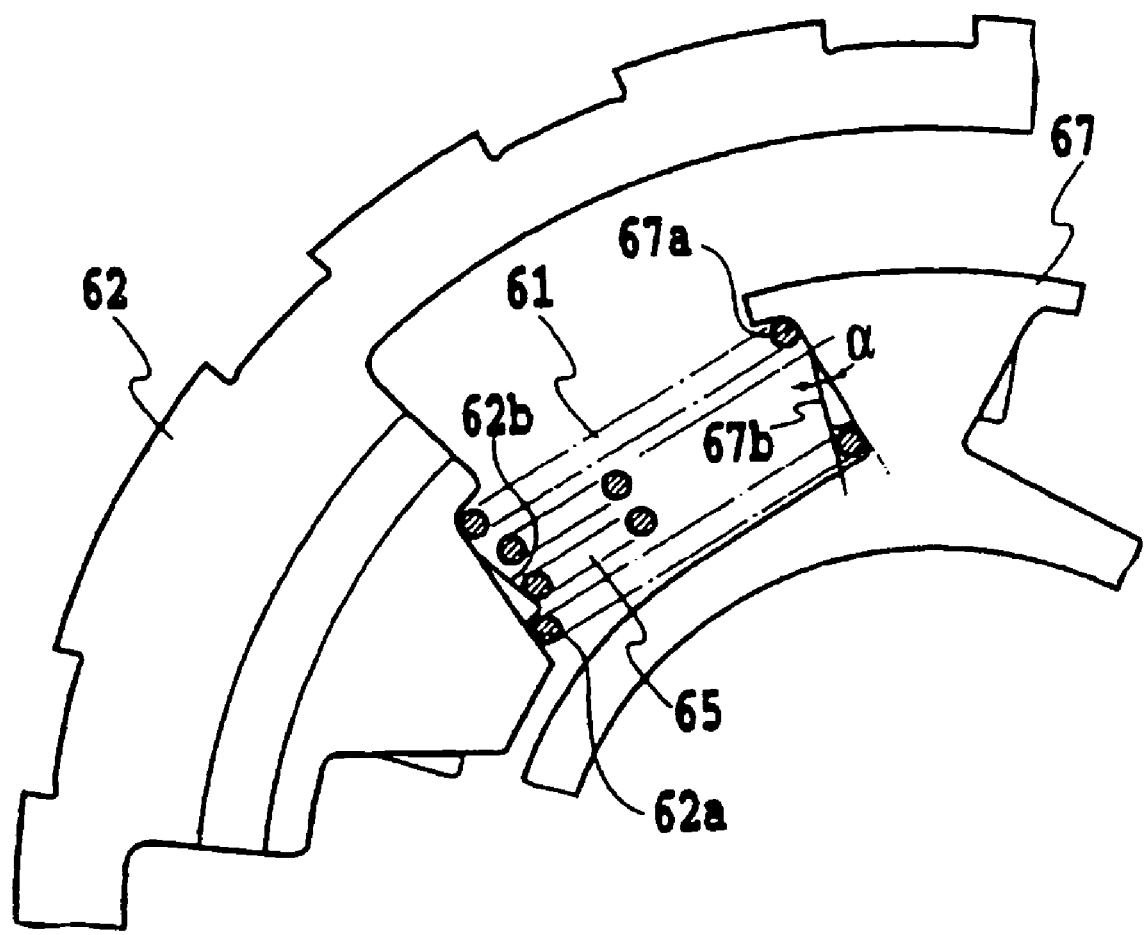
FIGS. 5A and 5B show surfaces of contact of a damper spring with the intermediate plate and the drive plate in accordance with another embodiment.
Figure 5B:
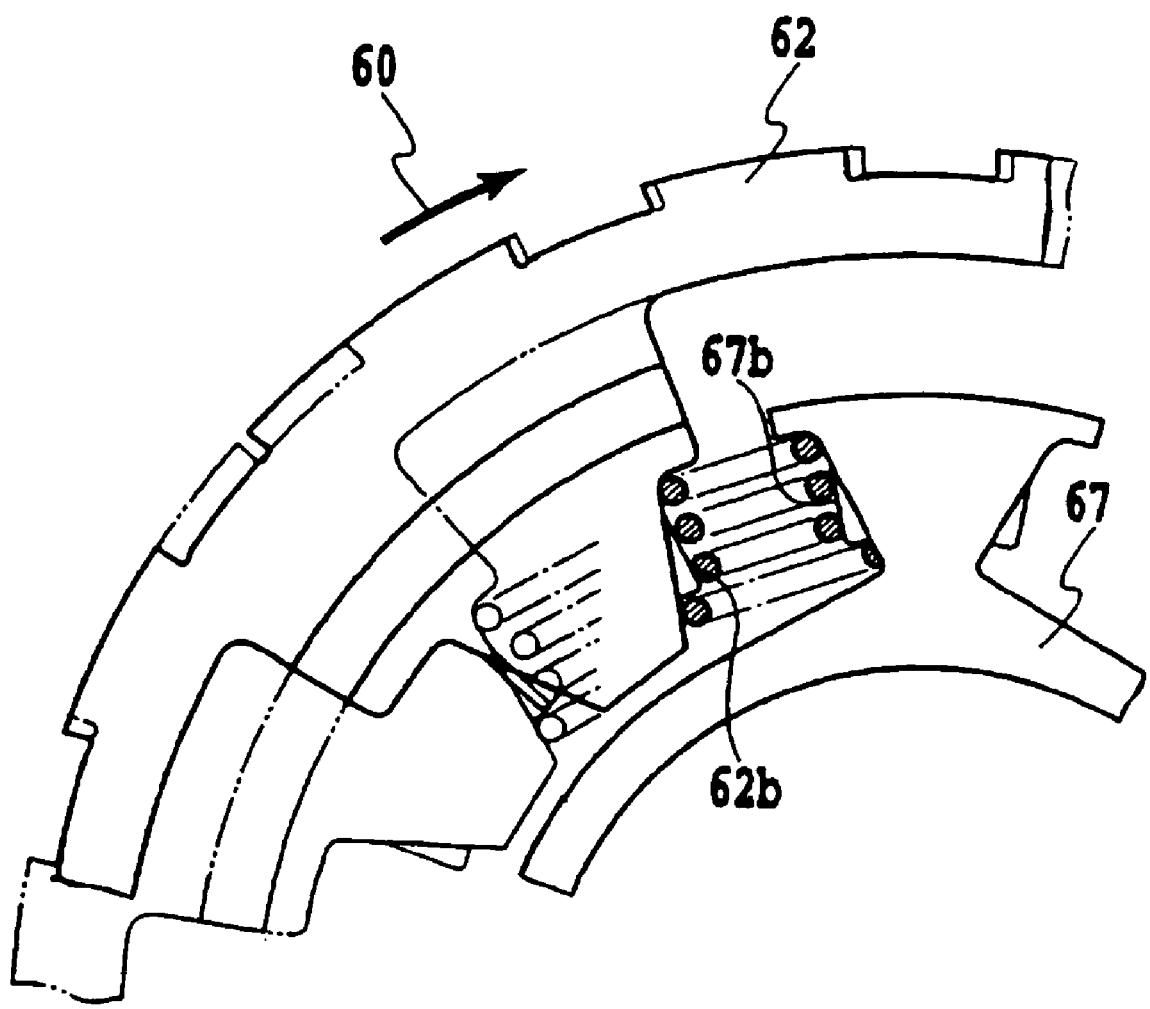

FIGS. 5A and 5B show surfaces of contact of the damper springs with the intermediate plate and the drive plate. FIG. 5A illustrates a state where the intermediate plate and the drive plate are in contact with a first spring. FIG. 5B illustrates a state where the drive plate has been turned in the direction indicated by an arrow 60 from the position indicated in FIG. 5A so that the intermediate plate and the drive plate contact a second spring.

In this embodiment, second springs are provided instead of the outer springs provided in the foregoing embodiment, and other component elements are substantially the same as those of the foregoing embodiment. Therefore, detailed description of the embodiment shown in FIGS. 5A and 5B will be omitted.

In the embodiment shown in FIGS. 5A and 5B, coil springs 61 as first springs are disposed between a drive plate 62 and an intermediate plate 67. In each spring 61, a coil spring 65 having a smaller diameter and a shorter length is disposed coaxially as a second spring. The intermediate plate 67 and the drive plate 62 have contact surfaces 67a, 62a that contact the first springs 61 and contact surfaces 67b, 62b that contact the second springs 65 so that the first springs 61 and the second springs 65 are uniformly compressed in accordance with the relative angle between the drive plate 62 and the intermediate plate 67. The angle α between the contact surfaces 67a, 62a and the contact surfaces 67b, 62b on a plane (the sheet of drawing of FIG. 5) perpendicular to the rotation axis 80 is open toward the rotation axis 80, and is greater than a predetermined angle (e.g., 0°). It is preferable that the angle α between the contact surface 67a, 62a and the contact surface 67b, 62b be smaller than a second predetermined angle (e.g., 90°).

In the damper device constructed as described above, the first springs 61 substantially perpendicularly contact the contact surfaces 67a of the intermediate plate 67 and the contact surfaces 62a of the drive plate 62. If the drive plate 62 is then turned, for example, in the direction of the arrow 60, the second springs 65 come into contact with the contact surfaces 67b of the intermediate plate 67 and the contact surfaces 62b of the drive plate 62 at a predetermined twist angle. In this case, it is preferable that the second springs 65 perpendicularly contact the contact surfaces 67b, 62b and that the first springs 61 contact the contact surfaces 67a, 62a without a skewed contact.

That is, at a predetermined twist angle, the angle between the contact surfaces 67a, 62a and the contact surfaces 67b, 62b is an appropriate angle, so that uniform compression is accomplished without skewed contacts of the contact surfaces. Therefore, the springs can be operated in a stable state. Hence, the hysteresis in spring characteristics can be reduced and the durability of the springs can be improved.

Although in the embodiment, the springs 61, 65 are disposed between the intermediate plate 67 and the drive plate 62, it is also possible to adopt a construction in which the intermediate plate 67 is omitted and the springs 61, 65 are disposed between the drive plate 62 and a guide plate (not shown) as in the first embodiment.

Next, an embodiment of the lock-up clutch device incorporating the damper device of the invention will be described with reference to FIG. 4.

The lock-up clutch of this embodiment is formed by the damper device 1, pistons 105, a drum member 113 having friction plates 101 on both sides, etc. The drum member 113, that is, a support member that has, on both sides thereof, friction plates 101 each of which has a friction surface, is fitted into recesses 13 formed along an outer periphery of the drive plate 10, that is, an input-side rotating member of the damper device 1. It is preferable that the drum member 113 be connected to the drive plate 10 by, for example, spline fitting, so that the drum member 113 can be moved in the direction of the axis.

Thus, the connection of the friction plate to the damper device of the invention via the drum member allows realization of a lock-up clutch in a simple construction.

That is, by fitting the drum member 113 having the friction plates 101 to the drive plate 10, it becomes possible to position the friction plates 101 in radial directions in a simple manner. Therefore, transient unstableness of transferred torque during the lockup can be prevented. Furthermore, it becomes possible to prevent, for example, unstableness of transferred torque and overload on component members that would otherwise occur due to a tilt of the friction plates 101 when the friction plate 101 is pushed in the direction of the axis by the piston 105.

Furthermore, since the drive plate 10 is positioned in radial directions as described above, the friction plate 101 can also be positioned in radial directions in a similar manner.

That is, by fitting the drum member 113 having the friction plates 101 to the drive plate 10, it becomes possible to position the friction plates 101 in radial directions in a simple manner. Therefore, transient unstableness of transferred torque during the lockup can be prevented. Furthermore, it becomes possible to prevent, for example, unstableness of transferred torque and overload on component members that would otherwise occur due to a tilt of the friction plates 101 when the friction plate 101 is pushed in the direction of the axis by the piston 105.

Combining this construction with the above-described damper will realize a lock-up clutch device that is reduced in size in radial directions and that is particularly suitable for a torque converter.

Figure 6:
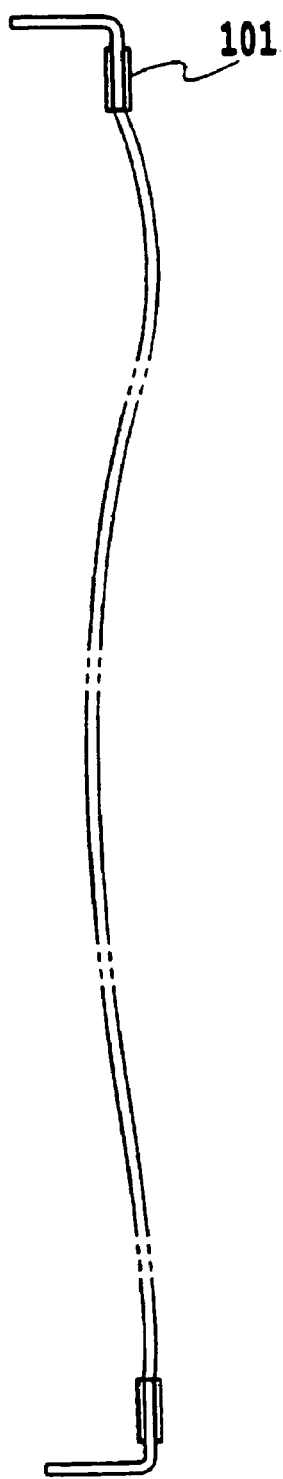
FIG. 6 is a schematic diagram illustrating protrusions and recesses of a support member provided for forming undulations on a friction surface of the lock-up clutch device.

In still another embodiment as shown in FIG. 6, the friction plates 101 or the drum member 113, that is, a support member, are provided with wavy surfaces that are protruded and receded in the direction of the axis of the rotation axis 80 as shown in FIG. 6. Wavy protrusions and recesses are contiguous in circumferential directions, and are formed substantially uniformly (similar patterns are also possible) in radial directions. Thus, the friction surfaces extend in a wavy fashion in circumferential directions.

Generally, in lock-up clutches that are operated based on pressure difference caused by the flow of hydraulic oil by the outer periphery of the piston 105, the friction surfaces of the friction plates 101 serve to seal so as to maintain the pressure difference across the friction plates during the lockup.

Hence, the provision of a wavy friction surface as described above for the friction surface 101 achieves uniform flows of hydraulic oil passing by the outer periphery of the friction surface of the friction plate 101 during lockup release, and therefore substantially prevents occurrence of a great dragging torque caused by the friction plate 101 being pressed against the piston 105 of the housing member 107.

As is apparent from the foregoing description, the invention allows size reductions of a damper device in radial directions. Furthermore, the lock-up clutch device incorporating this damper device can also be reduced in size in radial directions.

What is claimed is:

1. A damper device comprising:
   a first rotating member having a rotation axis and being rotatable;
   a second rotating member rotatable about the rotation axis relative to the first rotating member via an elastic member, wherein the first and second rotating members include a driving-side rotating member and a driven-side rotating member, and wherein the driven-side rotating member is formed by at least two members that guide the elastic member and sandwich the driving-side rotating member;
   an axial-direction support portion that supports the first rotating member and the second rotating member in a direction of the rotation axis with respect to each other; and
   a radial-direction support portion that is disposed on a circumference, whose distance from the rotation axis is substantially equal to a distance of the axial-direction support portion from the rotation axis, and that supports the first rotating member and the second rotating member in a radial direction with respect to each other,
   wherein the axial-direction support portion and the radial-direction support portion are alternately disposed about a circumference of the clutch and are disposed respectively at substantially equal intervals,
   wherein each one of the at least two members of the driven-side rotating member has a first tab and a second tab that is provided inwardly of an outermost periphery of the first tab, and a portion of the first tab which sandwiches the driving-side rotating member includes the axial-direction support portion, and the second tab includes the radial-direction support portion.

2. The damper device according to claim 1, wherein the axial-direction support portion and the radial-direction support portion are alternately disposed and are disposed respectively at substantially equal intervals on the circumference that is located inward of an outermost periphery of the first rotating member.

3. The damper device according to claim 1, wherein the first rotating member and the second rotating member respectively have stopper portions that contact each other at a predetermined relative angle, and the stopper portions are disposed on a circumference whose distance from the rotation axis is substantially equal to the distances of the axial-direction support portion and the radial-direction support portion from the rotation axis.

4. The damper device according to claim 1, wherein a fixation portion that fixes the at least two members to one another is disposed on a circumference whose distance from the rotation axis is substantially equal to the distances of the axial-direction support portion and the radial-direction support portion from the rotation axis.

5. The damper device according to claim 1, wherein the axial-direction support portion includes a first bent portion and a second bent portion which are formed in the at least two members, respectively, which form the driven-side rotating member; and the at least two members of the driven-side rotating member and the driving-side rotating member are disposed so that the first and second bent portions sandwich the a third bent portion formed in the driving-side rotating member.

6. The damper device according to claim 1, wherein the radial-direction support portion includes an outer edge of the driven-side rotating member;
   the driving-side rotating member has an annular member; and
   the driving-side rotating member is disposed so that an inner peripheral surface of the annular member and the outer edge of the driven-side rotating member face one another in close proximity.

7. The damper device according to claim 4, wherein a portion of the first tab which sandwiches the driving-side rotating member further includes a stopper portion and the fixation portion.

8. The damper device according to claim 7, wherein the first tab and the second tab are positioned offset from each other in the direction of the rotation axis.

9. The damper according to claim 1, wherein
   the elastic member is formed by a plurality of first springs which are disposed at approximately equal intervals in a circumferential direction about the rotation axis, and a plurality of second springs which are disposed at an outer side radially from the first springs and at approximately equal intervals in a circumferential direction about the rotation axis;
   the driving-side rotating member is provided with a contact surface which contacts one end of the first spring, and the driven-side rotating member is provided with a contact surface which contacts the other end of the first spring; and
   the driving-side rotating member holds the second spring, the driven-side rotating member has a contact surface which contacts the second spring at a predetermined relative angle.

10. The damper device according to claim 1, wherein the axial-direction support portion and the radial-direction support portion are positioned offset from each other in the direction of the rotation axis.

11. The damper device according to claim 1,
    wherein the elastic member includes a first spring, and a second spring that is disposed within the first spring and that has a shorter length and a smaller diameter than the first spring, and
    wherein one of the first rotating member and the second rotating member has a first contact surface that contacts the first spring, and the one of the first rotating member and the second rotating member has a second contact surface that contacts the second spring, and wherein the first contact surface and the second contact surface are formed to have a predetermined angle on a plane that is perpendicular to the rotation axis.

12. The damper device according to claim 11, wherein the first and second springs are disposed so that a axis of each of the first and second springs extends toward the rotation axis.

13. A damper device comprising:
a first rotating member having a rotation axis and being rotatable;
a second rotating member rotatable about the rotation axis relatively to the first rotating member via an elastic member;
an axial-direction support portion that supports the first rotating member and the second rotating member in a direction of the rotation axis with respect to each other; and
a radial-direction support portion that is deviated in position from the axial-direction support portion about a circumference of the clutch in a direction of rotation about the rotation axis and that supports the first rotating member and the second rotating member in a radial direction with respect to each other,
wherein the first and second rotating members include a driving-side rotating member and a driven-side rotating member, wherein the driven-side rotating member is formed by at least two members that sandwich the driving-side rotating member, and wherein each one of the at least two members of the driven-side rotating member has a first tab and a second tab that is provided inwardly of an outermost periphery of the first tab, and a portion of the first tab which sandwiches the driving-side rotating member includes the axial-direction support portion, and the second tab includes the radial-direction support portion.

14. The damper device according to claim 13, wherein the first rotating member and the second rotating member respectively have stopper portions that contact each other at a predetermined relative angle, and the stopper portions are disposed on a circumference whose distance from the rotation axis is substantially equal to the distances of the axial-direction support portion and the radial-direction support portion from the rotation axis.

15. The damper device according to claim 13,
wherein a fixation portion that fixes the at least two members to one another is disposed on a circumference whose distance from the rotation axis is substantially equal to the distances of the axial-direction support portion and the radial-direction support portion from the rotation axis.

16. The damper device according to claim 13, wherein the axial-direction support portion includes a first bent portion and a second bent portion which are formed in the at least two members, respectively, which form the driven-side rotating member; and the at least two members of the driven-side rotating member and the driving-side rotating member are disposed so that the first and second bent portions sandwich the a third bent portion formed in the driving-side rotating member.

17. The damper device according to claim 13, wherein the radial-direction support portion includes an outer edge of the driven-side rotating member;
the driving-side rotating member has an annular member; and the driving-side rotating member is disposed so that an inner peripheral surface of the annular member and the outer edge of the driven-side rotating member face one another in close proximity.

18. The damper device according to claim 15, wherein
a portion of the first tab which sandwiches the driving-side rotating member further includes stopper portions that contact each other at a predetermined relative angle and the fixation portion.

19. The damper device according to claim 18, wherein the first tab and the second tab are positioned offset from each other in the direction of the rotation axis.

20. The damper according to claim 13, wherein
the elastic member is formed by a plurality of first springs which are disposed at approximately equal intervals in a circumferential direction about the rotation axis, and a plurality of second springs which are disposed at an outer side radially from the first springs and at approximately equal intervals in a circumferential direction about the rotation axis;
the driving-side rotating member is provided with a contact surface which contacts one end of the first spring, and the driven-side rotating member is provided with a contact surface which contacts the other end of the first spring; and
the driving-side rotating member holds the second spring, the driven-side rotating member has a contact surface which contacts the second spring at a predetermined relative angle.

21. The damper device according to claim 13, wherein the axial-direction support portion and the radial-direction support portion are positioned offset from each other in the direction of the rotation axis.

22. The damper device according to claim 13,
wherein the elastic member includes a first spring, and a second spring that is disposed within the first spring and that has a shorter length and a smaller diameter than the first spring, and
wherein one of the first rotating member and the second rotating member has a first contact surface that contacts the first spring, and the one of the first rotating member and the second rotating member has a second contact surface that contacts the second spring, and
wherein the first contact surface and the second contact surface are formed to have a predetermined angle on a plane that is perpendicular to the rotation axis.

23. A lock-up clutch device of a torque converter, comprising a damper device comprising a first rotating member having a rotation axis and being rotatable;
a second rotating member rotatable about the rotation axis relative to the first rotating member via an elastic member;
an axial-direction support portion that supports the first rotating member and the second rotating member in a direction of the rotation axis with respect to each other; and
a radial-direction support portion that is disposed on a circumference, whose distance from the rotation axis is substantially equal to distance of the axial-direction support portion from the rotation axis, and that supports the first rotating member and the second rotating member in a radial direction with respect to each other,
wherein the axial-direction support portion and the radial-direction support portion are alternately disposed about a circumference of the clutch and are disposed respectively at substantially equal intervals, wherein the first and second rotating members include a driving-side rotating member and a driven-side rotating member, wherein the driven-side rotating member is formed by at least two members that sandwich the driving-side rotating member, and wherein each one of the at least two members of the driven-side rotating member has a first tab and a second tab that is provided inwardly of an outermost periphery of the first tab, and a portion of the first tab which sandwiches the driving-side rotating member includes the axial-direction support portion, and the second tab includes the radial-direction support portion.

24. The lock-up clutch device according to claim 23, further comprising a piston that is disposed concentrically with the damper device and is movable in the direction of the rotation axis, wherein a driving-side rotating member of the damper device is provided with a support portion that has, on two surfaces thereof, friction members, and the friction members are disposed between the piston and a housing of the torque converter.

25. The lock-up clutch device according to claim 23, wherein at least a friction surface of the friction members undulates in a circumferential direction.

26. A lock-up clutch device of a torque converter, comprising a damper device comprising a first rotating member having a rotation axis and being rotatable;

a second rotating member rotatable about the rotation axis relatively to the first rotating member via an elastic member;

an axial-direction support portion that supports the first rotating member and the second rotating member in a direction of the rotation axis with respect to each other; and a radial-direction support portion that is deviated in position from the axial-direction support portion in a direction of rotation about the rotation axis and that supports the first rotating member and the second rotating member in a radial direction with respect to each other, wherein the axial-direction support portion and the radial-direction support portion are alternately disposed about a circumference of the clutch and are disposed respectively at substantially equal intervals, wherein the first and second rotating members include a driving-side rotating member and a driven-side rotating member, wherein the driven-side rotating member is formed by at least two members that sandwich the driving-side rotating member, and wherein each one of the at least two members of the driven-side rotating member has a first tab and a second tab that is provided inwardly of an outermost periphery of the first tab, and a portion of the first tab which sandwiches the driving-side rotating member includes the axial-direction support portion, and the second tab includes the radial-direction support portion.

27. The lock-up clutch device according to claim 26, further comprising a piston that is disposed concentrically with the damper device and is movable in the direction of the rotation axis, wherein a driving-side rotating member of the damper device is provided with a support portion that has, on two surfaces thereof, friction members, and the friction members are disposed between the piston and a housing of the torque converter.

28. The lock-up clutch device according to claim 26, wherein at least a friction surface of the friction members undulates in a circumferential direction.

* * * * *